United States Patent
Fleck et al.

(10) Patent No.: US 7,500,127 B2
(45) Date of Patent: Mar. 3, 2009

(54) METHOD AND APPARATUS FOR OPERATING AN ELECTRONIC DEVICE IN A LOW POWER MODE

(75) Inventors: Rod G. Fleck, Bellevue, WA (US); Rex Antony Flynn, Newton, MA (US); Martin J. Kee, Sammamish, WA (US); Stephen L. Perrin, Lake Forest Park, WA (US)

(73) Assignee: Vulcan Portals Inc., Seattle, WA (US)

( * ) Notice: Subject to any disclaimer, the term of this patent is extended or adjusted under 35 U.S.C. 154(b) by 455 days.

(21) Appl. No.: 10/857,628

(22) Filed: May 28, 2004

(65) Prior Publication Data

US 2005/0076256 A1    Apr. 7, 2005

Related U.S. Application Data

(60) Provisional application No. 60/504,165, filed on Sep. 18, 2003.

(51) Int. Cl.
*G06F 1/00* (2006.01)
(52) U.S. Cl. ...................................... 713/324; 719/328
(58) Field of Classification Search ................. 713/324; 719/328
See application file for complete search history.

(56) References Cited

U.S. PATENT DOCUMENTS

| | | | |
|---|---|---|---|
| 5,537,343 A | 7/1996 | Kikinis et al. | |
| 5,560,022 A | 9/1996 | Dunstan et al. | 395/750 |
| 5,689,669 A | 11/1997 | Lynch et al. | |
| 5,763,960 A * | 6/1998 | Ceccherelli et al. | 307/41 |
| 5,768,164 A * | 6/1998 | Hollon, Jr. | 708/174 |
| D416,256 S | 11/1999 | Griffin et al. | |
| 5,978,923 A * | 11/1999 | Kou | 713/323 |

(Continued)

FOREIGN PATENT DOCUMENTS

EP    0 945 778    9/1999

(Continued)

OTHER PUBLICATIONS

Strietelmeier, Julie, "Official Gadgeteer Hands on Review: RIM BlackBerry 950 Internet Edition," XP002322212, Feb. 26, 2001. Retrieved from Internet, URL: http://www.the-gadgeteer.com/rim-blackberry-review.html, download date of Mar. 8, 2005.

*Primary Examiner*—Tse Chen
(74) *Attorney, Agent, or Firm*—Perkins Coie LLP

(57) ABSTRACT

An electronic device, such as a hand-held portable computer, is provided with capability to operate an application during a low power mode. During the low power mode, portions of hardware, software, services, and/or other components of the portable computer that are not necessary to the operation of the application is suspended or otherwise deactivated. As each task is performed by the application, the components that are no longer needed for subsequent tasks to be performed by the application are also deactivated and reactivated as needed. The deactivation can be performed in sequence from the highest-level components to the lowest-level components to ensure that components that are needed by other components are not prematurely deactivated. A specific set of events transitions the portable computer out of the low power mode.

14 Claims, 6 Drawing Sheets

U.S. PATENT DOCUMENTS

| | | | |
|---|---|---|---|
| 6,088,809 A | 7/2000 | Atkinson | 713/324 |
| D433,460 S | 11/2000 | Griffin et al. | |
| 6,243,819 B1 | 6/2001 | Jung | 713/320 |
| 6,278,442 B1 | 8/2001 | Griffin et al. | |
| 6,392,640 B1 | 5/2002 | Will | |
| 6,396,482 B1 | 5/2002 | Griffin et al. | |
| D460,493 S | 7/2002 | Griffin et al. | |
| D461,803 S | 8/2002 | Griffin et al. | |
| 6,452,588 B2 | 9/2002 | Griffin et al. | |
| D464,995 S | 10/2002 | Griffin et al. | |
| 6,489,950 B1 | 12/2002 | Griffin et al. | |
| 6,664,991 B1 | 12/2003 | Chew et al. | |
| 6,711,631 B1 | 3/2004 | Chan et al. | |
| 6,741,232 B1 | 5/2004 | Siedlikowski et al. | |
| 6,922,759 B1 | 7/2005 | Garritsen | |
| 2001/0037470 A1 | 11/2001 | Teshima et al. | 713/320 |
| 2002/0087225 A1 | 7/2002 | Howard | 700/94 |
| 2003/0023700 A1* | 1/2003 | Swinton et al. | 709/208 |
| 2003/0149904 A1 | 8/2003 | Kim | 713/330 |
| 2003/0156074 A1 | 8/2003 | Ranganathan et al. | 345/1.1 |
| 2004/0003225 A1 | 1/2004 | Cheng et al. | 713/1 |
| 2004/0268004 A1 | 12/2004 | Oakley | |
| 2005/0066006 A1 | 3/2005 | Fleck et al. | 709/206 |
| 2005/0066207 A1 | 3/2005 | Fleck et al. | 713/320 |
| 2005/0076256 A1 | 4/2005 | Fleck et al. | |

FOREIGN PATENT DOCUMENTS

| | | |
|---|---|---|
| EP | 1 028 425 | 8/2000 |
| WO | WO 03/029945 | 4/2003 |

\* cited by examiner

METHOD AND APPARATUS FOR OPERATING AN ELECTRONIC DEVICE IN A LOW POWER MODE

CROSS REFERENCE TO RELATED APPLICATION

The present application claims the benefit under 35 U.S.C. § 119(e) of U.S. Provisional Patent Application Ser. No. 60/504,165, entitled "SOFTWARE AND HARDWARE FEATURES FOR MINI-PC," filed Sep. 18, 2003, assigned to the same assignee as the present application and which is incorporated by reference in its entirety.

TECHNICAL FIELD

The present disclosure relates generally to electronic devices, and in particular but not exclusively, relates to an electronic device, such as a hand-held portable computer, that has the capability to run applications while in a low power mode.

BACKGROUND INFORMATION

Today's computer users are highly mobile individuals. Whether on business trips, on vacations, or coming to and from work, these individuals are readily identifiable by their use of laptops, enhanced-functionality cellular telephones, Palm Pilots™, Blackberries™, and other portable electronic devices. Indeed, many establishments provide Internet connections that cater to individuals who may be merely passing through the establishment for a short period of time and who require a network connection. For instance, Internet connections are available at airports and hotels, and even in restaurants and coffee shops.

Because of the portable nature of the electronic devices, there are certain limits to their capabilities. Power consumption is one of the prime examples. Power consumption is generally a minor issue in an operating environment where the user has "plugged" the electronic device into an electrical power outlet or has docked the electronic device into a docking station. In these situations, there is constant and substantially unlimited power for operating the electronic device, thereby eliminating the need for the electronic device to consume power from an internal power source, such as an internal battery, while plugged in.

However despite the proliferation of establishments that provide Internet connections (and typically a corresponding stationary power supply), there are still many instances when a stationary power supply is unavailable to the highly mobile user. In these instances, the electronic device needs to rely on its internal battery to supply the power necessary to run applications or to perform other functions with the electronic device.

If operated in a full power mode using power from the internal battery, the electronic device can generally operate for only a few hours before the battery is drained. In fact, many different software services, software applications, and hardware can run concurrently in the full power mode using various subsystems and components in the electronic device. A display, disk drive, and processor (especially a graphics processor) are some of the components of an electronic device that can run concurrently, yet consume a substantial amount of power.

To help reduce power consumption, especially when a stationary power supply is unavailable, many electronic devices include a "standby" mode in which the electronic device turns OFF and/or substantially reduces power to all of its subsystems and components. In such a standby mode, a user generally cannot use any applications unless the electronic device is switched from the standby mode to the full power mode. As such, it can often be necessary for the user to make only limited and very efficient use of the electronic device while it is in full power mode when there are no available stationary power supplies. Furthermore, it may even be necessary for the user to keep the electronic device completely turned off or in a substantially non-functional standby mode as much as possible.

If the user fails to diligently conserve power in this manner, then the electronic device will run out of power and become unusable until the user can recharge or replace the internal battery and/or connect to a stationary power supply. For instance, repeatedly accessing a hard disk drive when running applications can dramatically reduce the amount of available power that can be delivered from an internal battery. The constant need for software applications to access the hard disk drive is an important reason for limiting or eliminating the functionality of the applications in the standby mode. This constrained operating environment is inconvenient and impractical for a highly mobile user who may wish to use a portable electronic device for certain applications when there are no available stationary power supplies.

BRIEF SUMMARY OF THE INVENTION

One preferred aspect provides a method usable for an electronic device. The method includes monitoring for an event, and if the event is detected, determining operating parameters of an application. Based on the determined operating parameters, the method selectively deactivates elements of the electronic device and maintains active at least one element of the electronic device that is usable in connection with operation of the application. The method operates the application in the reduced power state of the electronic device using at least the active element of the electronic device.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to operate an electronic device, for example, a portable electronic device in the form of a hand-held portable computer in a low power mode are described herein. In the following description, numerous specific details are given to provide a thorough understanding of embodiments. The invention can be practiced without one or more of the specific details, or with other methods, components, materials, etc. In other instances, structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment provides an electronic device with capability to operate an application during a low power mode. A non-limiting example of such an electronic device is a portable electronic device. The electronic device, according to one embodiment, comprises a hand-held portable computer. During operation of the portable computer in the low power mode, hardware, software, services, and/or other components of the portable computer that are not necessary for operation of the application are suspended or otherwise deactivated. Furthermore, as each task is performed by the application, the components that are not needed for subsequent tasks are deactivated and reactivated as needed. The deactivation can be performed in sequence from the highest-level components to the lowest-level components to ensure that components that are needed by other components, or that are otherwise involved in operating dependencies with other components, are not prematurely deactivated. A specific set of events transitions the portable computer out of the low power mode into some other operating mode, such as a full power mode.

Figure 1:
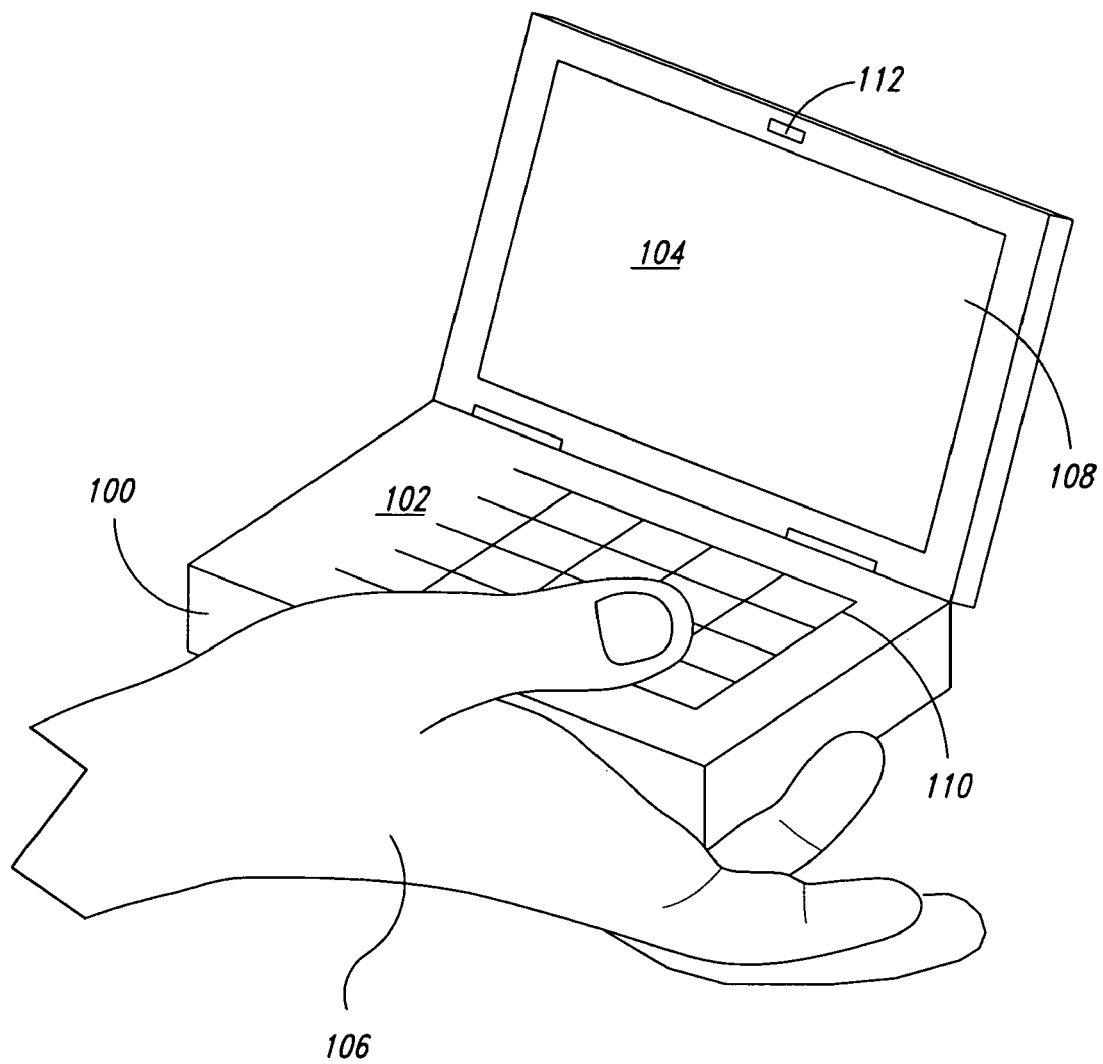
FIG. 1 is a front, top right isometric view of an example electronic device, which in this case is in the form of a hand-held portable computer including a lid shown in an open position.
Figure 2:
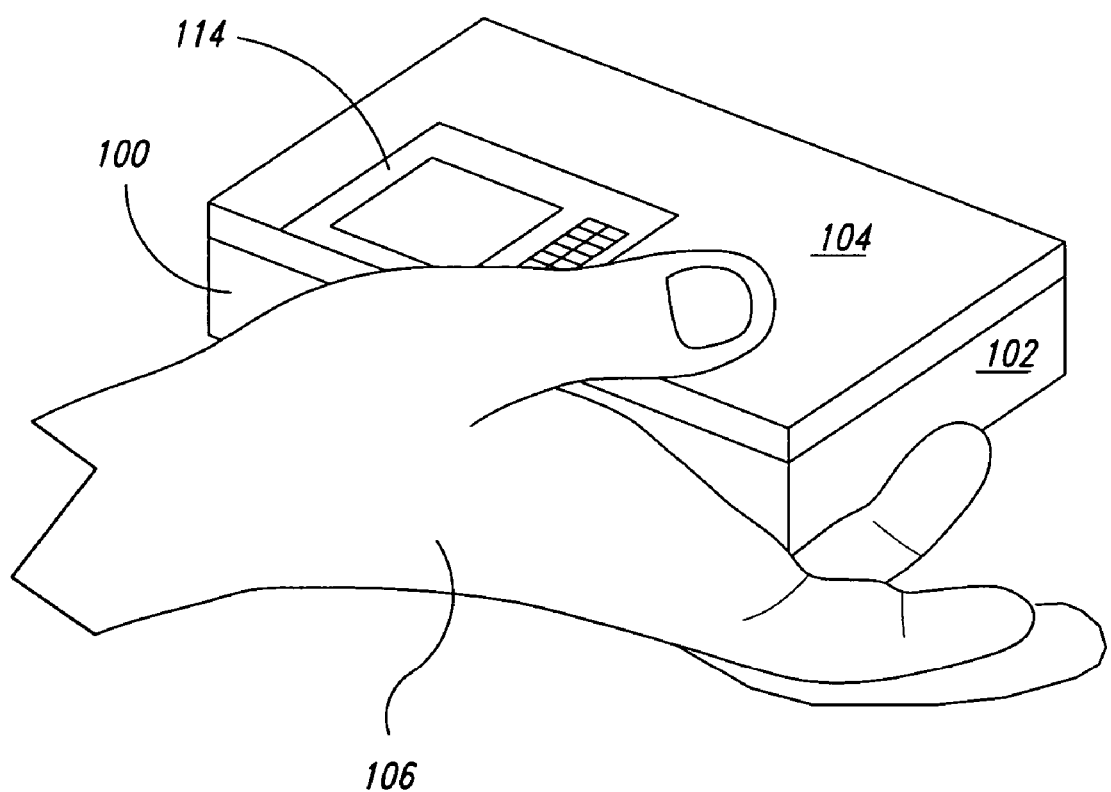
FIG. 2 is a front, top right isometric view of the example hand-held portable computer of FIG. 1 including the lid shown in a closed position.

FIGS. 1-2 show front, top right isometric views of an example electronic device, in this case a hand-held portable computer 100 in which an embodiment may be implemented. While the portable computer 100 is used as the illustrative example throughout this application, other embodiments may be implemented with devices that may not necessarily be thought of as a "computer" or with devices that may not necessarily have the same shape and appearance as the portable computer 100 illustrated in FIGS. 1-2. Examples include but are not limited to wireless communication devices, display devices, monitors, audiovideo equipment, consumer electronic devices, or other electronic device that can have power consumption issues that are addressable by the principles described herein.

As shown, the portable computer 100 is similar in appearance to a laptop computer, in that it comprises first and second portions 102 and 104, respectively, which are hinged. The first portion 102 can include a keypad or keyboard 110 and housing for the internal electronic components (such as one or more processors, machine-readable storage media, graphics drivers, and so forth). The second portion 104 operates as a lid that folds over the first portion 102 (when in a closed position, such as shown in FIG. 2), and includes a display screen 108 for displaying information or for otherwise presenting data (such as an emails, user interfaces, graphics, and the like) while the second portion 104 is unfolded to an upright position as shown in FIG. 1.

Unlike a conventional laptop computer, however, the portable computer 100 of one example embodiment is substantially smaller in size in terms of both volume and weight. For example, the portable computer 100 may be 140 mm long, 101 mm wide, and 30 mm thick (while closed), with a weight of approximately one pound. The display screen 108 on the second portion 104 may have a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIGS. 1-2, the portable computer 100 has a size such that it can be held securely in a hand 106 of a user whether in the open or closed position. In another embodiment, the portable computer 100 may have a larger or otherwise different form factor and/or have a greater weight.

In one specific embodiment shown in FIG. 2, the portable computer 100 can include a low power display 114 integrated within the second portion 104. In such an embodiment, the low power display 114 can be used to present certain information while the lid of the portable computer 100 is closed and the portable computer 100 is in the low power mode, or be used to present other forms of data. The low power display 114 also includes a user interface through which the user can interact with low power mode applications, trigger the portable computer 100 to transition to the low power mode, and other operations.

While the low power display 114 is depicted in FIG. 2 as being positioned on the surface of the second portion 104, the low power display 114 may be positioned elsewhere on the portable computer 100. For example, the low power display 114 may be positioned on side surfaces, the bottom surface, or any combination of surfaces of the portable computer 100.

In one embodiment that will be described below, the portable computer 100 of FIG. 1 includes a lid switch 112. The lid switch 112 operates as a type of trigger to indicate whether the lid of the portable computer 100 is open or closed. Thus, for example, when the lid of the portable computer 100 is closed as shown in FIG. 2, the lid switch 112 can make physical contact with an electromechanical connection, can change orientation, can be depressed, or experience any other type of change in state that causes a signal such as an interrupt to occur. Such an interrupt can be used by an operating system, a basic input/output system (BIOS), a service, or other software component to initiate a transition from one power state to another power state (e.g., to the low power mode). The lid switch 112 can be embodied with any suitable shape, mechanism, functionality, or other operating feature.

Examples of the portable computer 100 in which embodiments of the low power mode techniques may be implemented are disclosed in U.S. patent application Ser. No. 10/338,802, entitled "SYSTEM AND METHOD FOR HEAT REMOVAL FROM A HAND-HELD PORTABLE COMPUTER WHILE DOCKED"; U.S. patent application Ser. No. 10/338,815, entitled "NAVIGATION AND SELECTION CONTROL FOR A HAND-HELD PORTABLE COMPUTER"; U.S. patent application Ser. No. 10/338,761, entitled "HEAT DISSIPATION FROM A HAND-HELD PORTABLE COMPUTER"; and U.S. patent application Ser. No. 10/338,791, entitled "KEYBOARD WITH MOUSE FOR A HAND-HELD PORTABLE COMPUTER", all filed Jan. 7, 2003, assigned to the same assignee as the present application, and all of which are incorporated herein by reference in their entireties.

Figure 3:
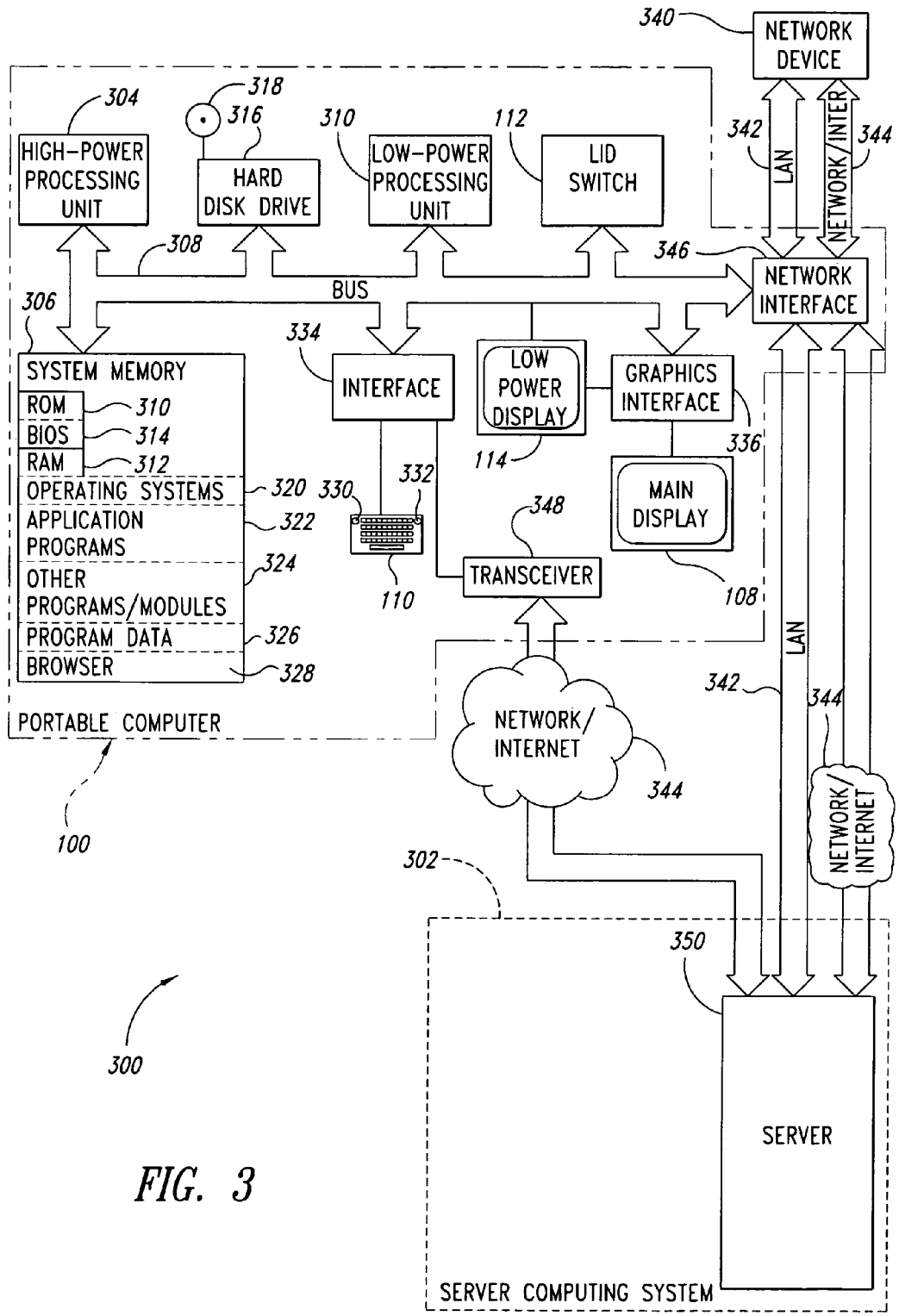
FIG. 3 is a block diagram of an embodiment of the portable computer and a representative operating environment in more detail.

FIG. 3 and the accompanying discussion provide a description of a suitable computing environment in which embodiments can be implemented. Although not required, embodiments will be described in the general context of hardware and computer-executable instructions, such as program application modules, objects, drivers, services, or macros being executed by a computer (such as by the portable computer 100). In addition to the embodiment shown in this figure, other embodiments can be practiced with other computer systems and/or network configurations.

FIG. 3 shows a computing system 300, and in particular shows an embodiment of the portable computer 100 in more detail. The computing system 300 includes the portable computer 100 and a server computing system 302. The server computing system 302 may be located at one or more network locations, for example, at one or more Internet Service Provider (ISP) locations to store and serve email information and to serve other information for the portable computer 100.

The portable computer 100 includes a high-power processing unit 304 for high-power processing, at least one system memory 306, and a system bus 308 that couples various system components including the system memory 306 to the high-power processing unit 304. The high-power processing unit 304 may be any logic processing unit, such as one or more central processing units (CPUs), digital signal processors (DSPs), graphics processors, application-specific integrated circuits (ASICs), etc.

In an embodiment, the portable computer 100 may also include a low-power processing unit 310 for low power processing, and which may or may not necessarily operate with the same operating system as the high-power processing unit 304. For example, in one embodiment separate operating systems, memory, applications, or other components can be provided for the high-power processing unit 304 and for the low-power processing unit 310. It is also possible in an embodiment for the high-power processing unit 304 and for the low-power processing unit 310 to share certain components, rather than having separate dedicated components.

The system bus 308 can employ any suitable bus structure or architecture, including a memory bus with memory controller, a peripheral bus, and a local bus. The system memory 306 may include one or more read-only memories (ROM) 310 and one or more random access memories (RAM) 312. In one embodiment, separate ROM 310, RAM 312, and/or other memory can be dedicated for the low power display 114. A BIOS 314, for example, which can be stored in the ROM 310, contains routines that help transfer information between elements within the portable computer 100, such as during start-up. Operation of an embodiment of the BIOS 314 in connection with a low power mode will be described in further detail below.

The portable computer 100 may include a hard disk drive 316 for reading from and writing to a hard disk 318. The hard disk drive 316 communicates with the high-power processing unit 304 via the system bus 308. The hard disk drive 316 may include interfaces or controllers (not shown) coupled between such drive(s) and the bus 308. The hard disk drive 316 and its associated hard disk 318 provide nonvolatile or otherwise persistent storage of computer readable instructions, data structures, program modules and other data for the portable computer 100. Although the depicted portable computer 100 employs the hard disk drive 316 and the hard disk 318, other types of drives and computer-readable media that can store data accessible by a computer may be employed, such as compact disks (CDs), magnetic cassettes, flash memory cards, digital video disks (DVDs), Bernoulli cartridges, RAMs, ROMs, smart cards, etc. In one embodiment, the hard disk drive 316 and/or other drives are not integrated within a housing of the portable computer 100 itself, but instead are external devices that are accessible via hardwire or wireless communication interfaces.

The system memory 306 can be used for storing various program modules, such as one or more operating systems 320, one or more application programs 322 (such as an email program, a media player, or other applications that can operate in a high power mode or in a low power mode), other programs or modules 324, and program data 326. A non-limiting example of an operating system 320 that may be used is Windows XP™, which is commercially available from Microsoft Corporation of Redmond, Wash. Windows XP™ as well as other suitable operating systems used with certain embodiments may include a power management subsystem. In an embodiment, power management capabilities are provided in connection with a low power mode that supplements power management provided by the power management subsystem of the operating system 320.

The program data 326 can be stored as a data structure, file, or other data format in a cache, database, or other storage unit integrated in or separate from the system memory 306. In one embodiment, the program data 326 includes power profiles and other power management data indicative of the power requirements of particular services, software, and hardware of the portable computer 100. As will be described later, this power management data is used in one embodiment to determine which component of the portable computer 100 to keep "ON" or to turn "OFF" during the low power mode, length of time to keep ON or OFF, sequence of turning various components ON or OFF, and other parameters and settings. Further detailed discussion of the various other programs/modules 324 that interact for managing and controlling operations in the low power mode and of the application program 322 (and more specifically, some type of suitable low power mode application program) will be provided below.

The portable computer 100 may also include a web browser 328 for permitting the portable computer 100 to access and exchange data with sources such as Internet web sites, corporate intranets, extranets, and/or other networks as described below, as well as other server applications on server computers. For purposes of clarity the browser 328 is shown separately in FIG. 3. According to various embodiments, the browser 328 can comprise one of the application programs 322, one of the other programs/modules 324, and/or may be integrated in some manner with the operating system(s) 320. While shown in FIG. 3 as being stored in the system memory 306, the operating systems 320, application programs 322, other programs/modules 324, program data 326, and browser 328 can be stored on the hard disk 318 of the hard disk drive 316 and/or other computer-readable media in another embodiment. Moreover, the various elements depicted as being stored in the system memory 306 need not necessarily reside on the same physical memory. For example, in embodiments where the low-power processing unit 310 and the low power display 114 can be operatively detached from the portable computer 100 or otherwise operate independently of other components of the portable computer 100, separate memory (having an operating system, RAM, ROM, applications, and other elements stored thereon) can be operatively decoupled from the portable computer 100 along with the low-power processing unit 310 and the low power display 114. In such an embodiment, the decoupleable components can be integrated in a low power display module (LPDM).

A user can enter commands and information into the portable computer 100 through one or more input devices (such as the keyboard 110) and a pointing device (such as a mouse 330 that may be, for example, built into the keyboard 110, an example embodiment of which is disclosed in U.S. patent application Ser. No. 10/338,791), or through such other types of devices usable for providing user input. Alternatively or additionally, the mouse 330 can be embodied as a touch pad as compared to physical buttons. Another input device may take the form of one or more buttons 332 on the side of the keyboard 110, with the button(s) 332 usable for scrolling and clicking via turning and pressing of the button(s) 332. Other possible input devices can include a microphone, joystick, game pad, scanner, etc. (not shown). These and other input devices are connected to the high-power processing unit 304 through an interface 334 such as a serial port interface that couples to the bus 308, although the portable computer 100 may employ other interfaces such as a parallel port, a game port or a wireless interface or a universal serial bus (USB). The interface 334 can be any suitable communication interface to the bus 308 and need not necessarily be a port per se. In one embodiment, the input devices such as a mouse, joystick, game pad, keyboard, etc. are integrated directly into the housing of the portable computer 100, rather than or in addition to being coupleable via a serial or parallel port interface.

The display screen 108 operates as the main display and is coupled to the bus 308 via a graphics interface 336, such as a video adapter or other graphics component that will allow video and other graphics to be rendered on the display screen 108. The low power display 114 may also be present in one embodiment to allow presentation of data (e.g., presentation on the outside surface of the second portion 104 of the portable computer 100) during the low power mode, when the lid is closed on the portable computer 100. The low power display 114 may be coupled to the bus 308 by way of the graphics interface 336 (or other interface) or may be directly coupled to the bus 308. The low power display 114 can be provided with its own user interface, such as buttons and menus. Also as depicted in FIG. 3, the lid switch 112 can be coupled to the system bus 308 to allow the various components of the portable computer 100 to detect and respond to a closing or opening of the lid of the portable computer 100.

The portable computer 100 can operate in a networked environment using logical connections to one or more remote computers and/or devices external to the portable computer 100, such as the server computing system 302 and a network device 340, such as a printer or network storage unit. The portable computer 100 is logically connected to one or more remote computing systems or devices under any suitable method of permitting computers to communicate, such as through a wireless local area network (WLAN) 342, a wireless wide area network (WWAN), or any other network 344, including wired and wireless networks that use or can communicate with the Internet (e.g., World Wide Web). Various embodiments can be implemented to communicate with several types of communication networks, including but not limited to, telecommunications networks, cellular networks, paging networks, wired and wireless enterprise-wide computer networks, intranets, extranets, the Internet, and other types of networks. Examples of wireless systems and protocols with which the portable computer 100 can communicate, include but are not limited to, Wi-Fi, Bluetooth, 802.11, and others.

When used in a LAN networking environment, the portable computer 100 can be connected to the LAN 342 through an adapter or network interface 346 (communicatively linked to the bus 308). When used in a WWAN or other network 344, the portable computer 100 may include a modem, transceiver 348 or other device, such as the network interface 346, for establishing communications over this networking environment or for otherwise communicating with external devices. The transceiver 348 as shown in FIG. 3 is communicatively linked between the interface 334 and the network 344. The transceiver 348 may be one or more transmitters, receivers, or other communication devices that are compliant with, for example, 802.11, GPS, Bluetooth, cellular (TDMA, FDMA, and/or CDMA), Wi-Fi, virtual private network (VPN), and/or other communication standards or techniques.

In one embodiment, the portable computer 100 is communicatively linked to the server computing system 302 through the LAN 342 and/or the network 344 with transmission control protocol/Internet protocol (TCP/IP) middle layer network protocols or other network protocol layers, such as User Datagram Protocol (UDP). The network connections shown in FIG. 3 are only some examples of establishing communication links between computers, and other links can be used, including both hardwire and wireless links.

The server computing system 302 includes one or more servers 350. In the context of email, the server 350 can comprise an email server. An example of such a server is a Microsoft Exchange™ server, and the principles described herein are not to be limited to only email implementations that use a Microsoft Exchange™ server.

Figure 4:
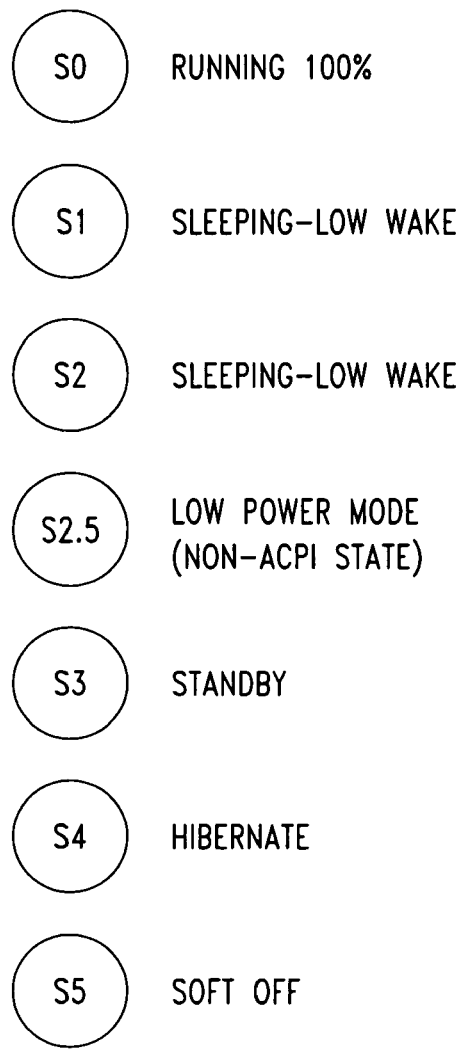
FIG. 4 is a diagrammatic representation of power states in accordance with one embodiment.

FIG. 4 is a diagrammatic representation 400 of power states in accordance with one embodiment. More particularly, FIG. 4 shows operating power states S0-S2 and S3-S5 that are supported by the Advanced Configuration and Power Interface (ACPI) specification and a non-ACPI-defined low power mode state S2.5 in accordance with one embodiment. Typically, the S0-S2 and S3-S5 power states are defined in power profiles that are integrated as part of a power management subsystem (such as a Windows power management subsystem) in the operating system 320. For the sake of brevity, only a summary of the ACPI power states will be provided herein. Further details of the ACPI power states can be found in Compac Computer Corporation et al., "Advanced Configuration and Power Interface Specification," Revision 2.0c, Aug. 25, 2003. Moreover, another embodiment can be based on power states that are not necessarily compliant with the ACPI specification.

In the S0 power state, the high-power processing unit 304 is executing instructions at its full clock speed, and the portable computer 100 is otherwise operating at substantially full (e.g., 100%) capacity. For instance, many services are operational and performing their tasks, data is being written to and read from the hard disk drive 316, the main display screen 108 is rendering content, and other working state tasks are being performed.

The S1 power state is a sleeping-low wake mode. In the S1 power state, the high-power processing unit 304 (or other processing unit) is not executing instructions. Processor context is maintained, and all system clocks and memory are in refresh. The S2 power state is also a sleeping-low wake mode that is logically lower than the S1 power state, and is assumed to conserve more power. The processor context is not maintained, and the clock of the high-processing unit 304 is stopped. Moreover, all system clocks, cache(s) and memory are in refresh, and all power resources that supply a system-level reference of S0 or S1 are in the OFF state. The S1 and S2 power states are low wake modes in that any interrupt (such as the pressing of a key on the keyboard 110) generally awakens or transitions the portable computer 100 from these modes.

The S3 power state is a standby mode and is logically a lower power state than the S2 power state. Memory is continuously running and refreshed, and so the data context of the RAM 312 is maintained, for instance. However, the high-power processing unit 304, components associated with the graphics system, the hard disk drive 316, the main display screen 108, and other components of the portable computer 100 are turned OFF and no services are running. In one embodiment, a few specific actions awaken the portable computer 100 from the S3 power state, such as pressing a power button, opening the lid of the portable computer 100 (thus activating the lid switch 112), and the receipt of a wake-on-LAN/USB/fax signal.

In the S4 power state, the portable computer 100 is in a hibernate mode. The data context of the RAM 312 is not maintained, and most components are turned OFF and not running. The S5 power state is logically the lowest power state, and is a soft OFF mode that requires a complete boot-up when awakened.

In accordance with an embodiment, an intermediate power state is provided between the S2 and S3 power states. This is a low power mode and non-ACPI-defined power state, which is labeled in FIG. 4 as the power state "S2.5." The label "S2.5" is used herein merely for the sake of convenience and ease of explanation and to provide context, and is not intended to limit the invention to strictly an ACPI environment.

In an embodiment of the S2.5 power state, most of the components of the portable computer 100 are turned OFF. However, a low power mode application is operating, and the various components of the portable computer 100 that are required to support operation of that low power mode application are selectively ON or otherwise running, until such components are no longer needed during operation of the low power mode application (in which case such components are then turned OFF). The speed of the clock in the high-power processing unit 304 is also reduced to a minimum low speed to support the low power mode application. For instance, the speed of the clock during the low power mode can be set to a minimum speed that is specified for the high-power processing unit 304, a non-limiting and purely illustrative example of which is approximately 433 MHz. As such, for transitioning to and operating in the S2.5 power state, the sequence and duration of turning OFF certain unnecessary components can minimize power consumption. Moreover, the portable computer 100 will not be awakened from the S2.5 power state by any basic interrupt (as contrasted with the S1 or S2 power states). Rather, only specific events will cause a transition to a higher power state (e.g., S0), such as opening the lid of the portable computer 100. Further details of low power mode operation in the S2.5 power state, including transitioning to and from the low power mode, are provided below.

Figure 5:
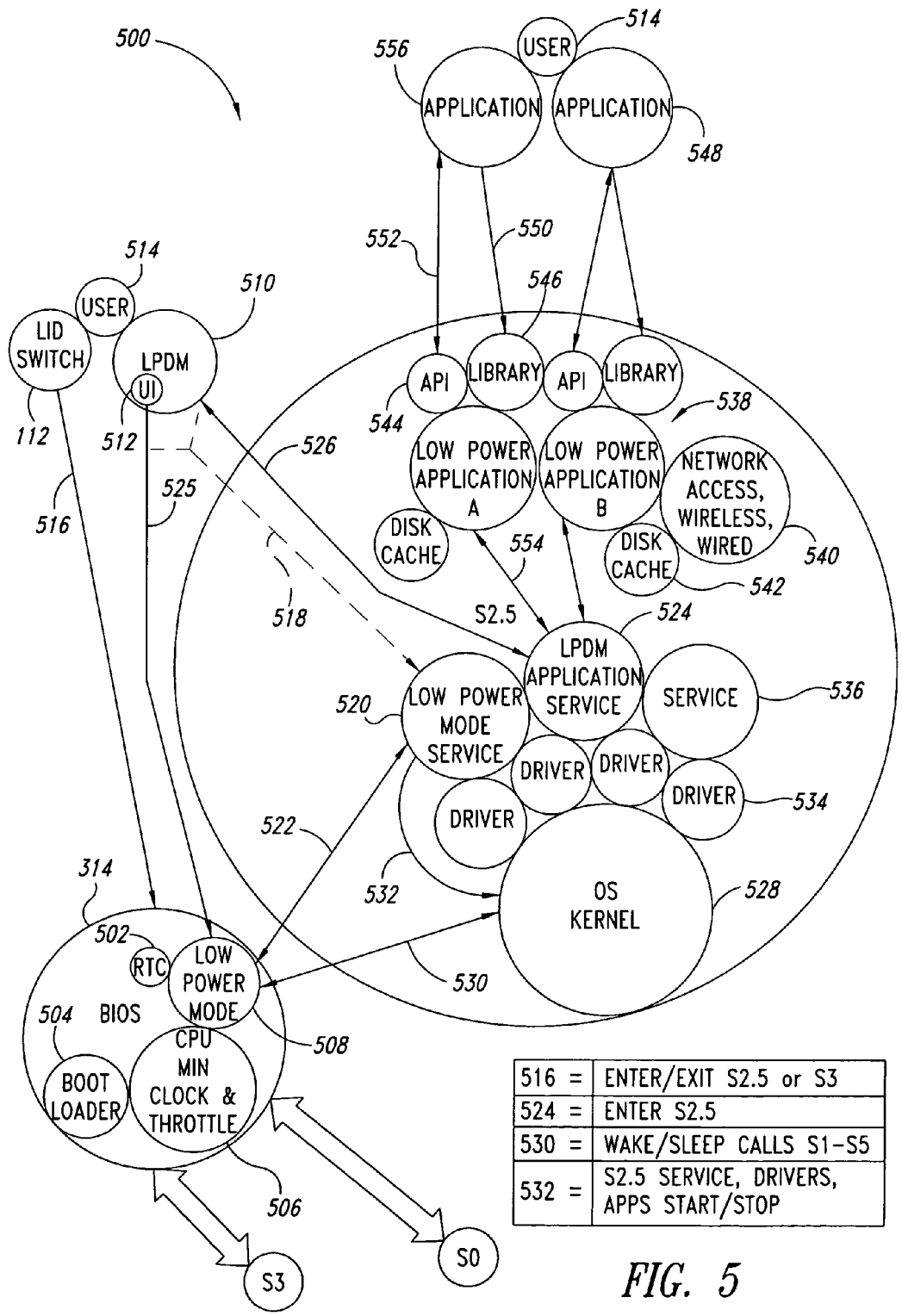
FIG. 5 is a diagrammatic representation of interaction and operation of various components of the portable computer in view of the power states of FIG. 4, according to one embodiment.

FIG. 5 is a diagrammatic representation 500 of interaction and operation of various components of the portable computer 100 in view of the power states of FIG. 4, according to one embodiment. More particularly, the diagrammatic representation 500 illustrates operation in the low power mode (i.e., the S2.5 power state) in more detail.

The BIOS 314 includes a real time clock (RTC) 502, a bootloader 504, and a CPU minimum clock and throttle 506. According to one embodiment, the BIOS 314 includes a low power mode subsystem 508, which interacts with other low power mode components to control and manage transition to and from the S2.5 power state, and to manage and control the turning of certain components (generally hardware-related components) OFF or ON in connection with low power mode operation. The low power mode subsystem 508 can be embodied in software source code, software object code, or other machine-readable instructions. Furthermore, the BIOS 314 can control and manage transitions into and out of the S0 and S3 power states, as indicated in FIG. 5.

Transitioning or otherwise entering into the S2.5 power state (or also entering the S3 power state) according to one embodiment can be performed by closing the lid of the portable computer 100, thereby triggering or otherwise activating the lid switch 112. Additionally, exiting the S2.5 power state (or also exiting the S3 power state) can be performed by opening the lid of the portable computer 100, which also triggers a change in state of the lid switch 112. An arrow 516 in FIG. 5 represents the entering into and exiting from the S2.5 power state. The arrow 516 indicates that the entering/exiting may be performed by a BIOS call, an interrupt, or other communication to the BIOS 314 from the lid switch 112. When entering the low power mode of the S2.5 power state, the low power mode subsystem 508 of the BIOS 314 then wakes up a low power mode service 520 (indicated by an arrow 522). Alternatively or additionally, a broken arrow 518 represents that the transition to or from the S2.5 power state can be performed by a direct communication (as a result of activation of the lid switch 112) to the low power mode service 520 from the lid switch 112.

In an embodiment, entering the S2.5 power state also can be performed via a low power display module (LPDM) 510 that includes the low power display 114. The LPDM 510 includes a user interface 512 (which can be embodied as controls, buttons, or menus on the low power display 114) that can communicate (indicated with an arrow 525) with the low power mode subsystem 508 of the BIOS 314 to initiate transition into the S2.5 power state. Alternatively or additionally, the user interface 512 can communicate directly with the low power mode service 520 (also represented by the broken arrow 518) to initiate transition into the S2.5 power state. Further alternatively or in addition, the LPDM 510 (including its user interface 512) can communicate with an LPDM application service 524 (indicated by an arrow 526) to initiate transition into the S2.5 power state or to otherwise present information during the low power mode (such as playing of media files or presentation of email on the low power display 114). A user 514 can operate the lid switch 112 or the LPDM 510 to trigger transition into an applicable power state.

The low power mode service 520 of one embodiment comprises a service, program, subroutine, module, or other software code or set of machine-readable instructions that is always running. In the S0 power state, the low power mode service 520 is running but is basically performing a minimal amount of tasks, or more specifically, the low power mode service 520 is monitoring for certain activities that signal a need to transition to the S2.5 power state. An example of such a monitored activity is activation of the lid switch 112, which indicates a closing or opening of the lid of the portable computer 100.

When the lid is closed or some other activity signals a need to transition to the low power mode of the S2.5 state, the low power mode service 520 wakes up or otherwise becomes more active, and determines which low power mode application is to be made active in the low power mode (if any); determines the hardware, software, and power needs for that low power mode application from information provided by the low power mode application and/or from power profiles comprising part of the program data 324; communicates with either or both the BIOS 314 or with an operating system kernel 528 (as indicated by an arrow 532) to turn certain elements OFF in a specific sequence; or otherwise performs tasks associated with operating the portable computer 100 in the low power mode. The arrow 522 also represents this communication to the BIOS 314 by the low power mode service 520, and an arrow 532 represents the communication to the operating system kernel 528 by the low power mode service 520. The operating system kernel 528 and/or the BIOS 314 can then selectively begin powering down unnecessary hardware, software, services, and other elements. In the context of email in one embodiment, the arrow 522 also represents the turning ON and OFF of the low power mode subsystem 508 of the BIOS 314, to allow activation and deactivation of elements of the portable computer 100 (such as the transceiver 348) that are used for periodic polling of an external server (such as the server 350) for new email.

In an embodiment, the low power mode service 520 sends a suspend-until-resume (as compared to suspend-until-interrupt) message to either or both the operating system kernel 528 and the BIOS 314, so as to suspend tasks that are not needed, unused, or otherwise irrelevant during the low power mode. When a resume signal is sent from the low power mode service 520, the suspended tasks are resumed from the point where they were suspended. It is noted that an embodiment removes these tasks from suspension with a resume signal, as compared to an interrupt. An interrupt often removes elements from a standby state in existing systems. However, with an embodiment, interrupts are generated while operating in the low power mode, and therefore, resume signals rather than interrupts are used to remove elements from suspension to ensure that such elements remain suspended during the low power mode and do not perform unnecessary tasks (and therefore unnecessarily consume power).

The low power mode service 520 can comprise part of the program/modules 324 shown in FIG. 3. In one embodiment, the low power mode service 520 comprises a service that can be written using the Microsoft Win32 Software Development Kit (SDK), so as to allow the service to interact and interface with the operating system kernel 528. The operating system kernel 528, such as a Windows XP™ kernel, can in turn comprise part of the overall operating system 320.

In the case of the operating system kernel 528, it can make calls to the BIOS 314 to turn ON or turn OFF certain elements during the S1-S5 power states, as represented by an arrow 530. In one embodiment, this includes direct BIOS calls to the low power mode subsystem 508 to turn OFF certain hardware elements that are not necessary for the low power mode. Alternatively or additionally, the operating system kernel 528 can turn OFF certain software elements, such as unnecessary services 536 or applications, by turning OFF their corresponding drivers 534. The operating system kernel 528 can also selectively turn ON such services 536 or applications by activating their drivers 534.

In an embodiment operating in the low power mode, the low power mode service 520 and/or the LPDM application service 524 interacts with one or more low power mode applications 538 (indicated as low power applications A and B in FIG. 5). An example of the low power application A is a media player, such a low power media player disclosed in U.S. application Ser. No. 10/857,627, entitled "LOW POWER MEDIA PLAYER FOR ELECTRONIC DEVICE," and filed May 28, 2004. An example of the low power application B is a client-side email program, such as disclosed in U.S. application Ser. No. 10/841,222, entitled "METHOD AND SYSTEM FOR MANAGING EMAIL ATTACHMENTS FOR AN ELECTRONIC DEVICE," filed May 7, 2004; U.S. application Ser. No. 10/841,229, entitled "METHOD AND SYSTEM FOR POLLING AND CACHING EMAILS FOR AN ELECTRONIC DEVICE," filed May 7, 2004; and U.S. application Ser. No. 10/841,231, entitled "METHOD AND SYSTEM FOR EMAIL SYNCHRONIZATION FOR AN ELECTRONIC DEVICE," filed May 7, 2004. All of these patent applications are assigned to the same assignee as the present application and are incorporated herein by reference in their entireties.

There may also be some type of network access component 540 (either or both wireless or wired) that can be selectively activated during the low power mode. Examples of the network access component 540 include the transceiver 348 or the network interface 346. The low power mode applications 538 and the network access component 540 can access a disk cache 542 or other suitable volatile memory location as needed during the low power mode, wherein the disk cache 542 can comprise part of the RAM 312 or other storage unit.

The low power mode applications 538 can communicate with installed applications 548 and 556 during the low power mode. Examples of these installed applications include Windows Media Player™ 9 and Microsoft Outlook™ 2003. In an embodiment, these installed applications 548 and 556 provide supporting functions and data for the low power mode applications 538 during the low power mode. As an example, if the installed application 556 is Windows Media Player™ 9, then the low power application A (e.g., a low power media player) can interact with the installed application 556, via an application program interface (API) 544 or other suitable means for communicating information between the low power media player 538A and the installed application 556, to use the play, stop, fast forward, pause, rewind, or other functions of the installed application 556. An arrow 552 represents this interaction. Use of these existing functions of the installed application 556 by one embodiment avoids the need to create code for the low power application A to perform the same functions.

Information such as playlists, songs, titles, artists, time, etc. is maintained by the installed application 556 (depicted by an arrow 550) in one or more libraries 546, which is in turn accessible by the low power application A. Arrows 554 and 526 represent that this library information can be forwarded by the low power application A to the LPDM application service 524 and then to the LPDM 510 for presentation on the low power display 114. Thus, an embodiment of the LPDM application service 524 is usable for communicating information between the low power media player 538A and the LPDM 510.

Figure 6:
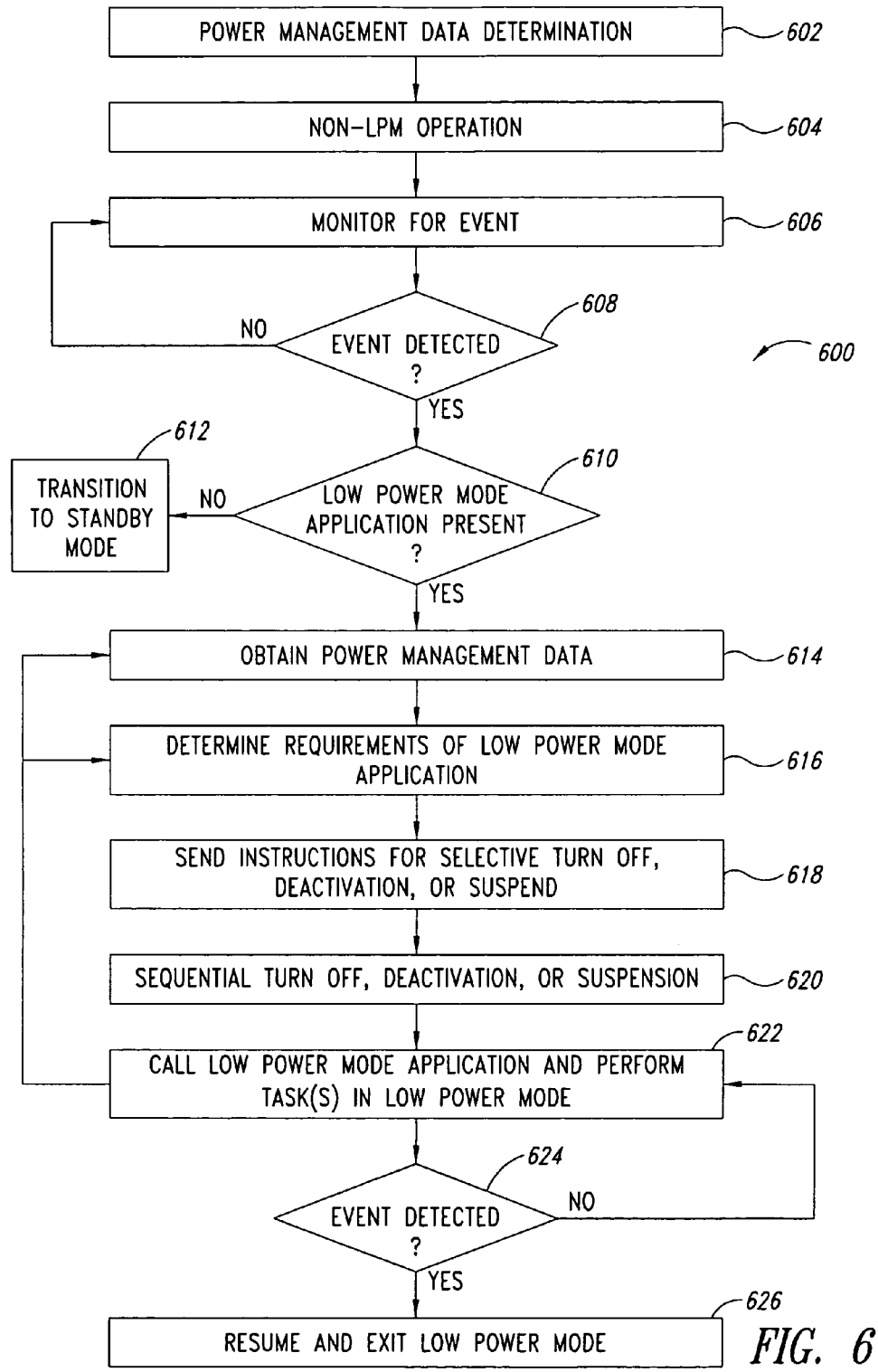
FIG. 6 is a flowchart of a technique for operating the portable computer in a low power mode in accordance with one embodiment.

FIG. 6 is a flowchart 600 of a technique for operating the portable computer 100 in the low power mode or other reduced power state in accordance with one embodiment. Features represented by the flowchart 600 can be embodied in software source code, software object code, or other machine-readable instructions stored on a machine-readable medium. For example, some operations depicted in the flowchart 600 can be performed by the low power mode service 520 embodied as software code in the system memory 306 and using power management data stored therein or in some other storage location of the portable computer 100. The various operations need not necessarily be performed in the exact order shown, and that some operations can be added, removed, modified, or combined.

Beginning at a block 602, power management data determination is performed. In this operation, applications that are to be made available in the low power mode are first identified (e.g., the low power mode applications 538). Next, the specific power, hardware, and software requirements or other operating parameters for these applications are determined. For example for a low power MP3 player, a wireless 802.11 network connection is not needed or is otherwise irrelevant, and therefore the associated modem hardware and software can be selected for deactivation during the low power mode. However, such modem hardware and software may be needed by an email application program, and therefore, this modem hardware and software are not selected for deactivation if the email application program is to be used in the low power mode. Certain elements, such as the main display screen 108 can be selected for deactivation, since the lid of the portable computer 100 is generally closed during the low power mode.

Additional information that can be determined at the block 602 includes minimum processor speed for an application, minimum power consumption for certain tasks, supporting services that run and when such services are to be running, which peripheral devices and supporting hardware and software can be deactivated when using a particular low power mode application, and so on. Additionally, determination is made of certain processor threads or tasks that can be suspended (to ensure that these tasks are not performed during the low power mode), and then resumed when the low power mode is exited. Also, a proper sequence of turning OFF certain elements can be determined and set. For instance, the highest-level components are to be turned OFF by one embodiment before the lowest-level components are turned OFF (e.g., a disk drive is not turned OFF until the services that are using the disk are turned OFF). Many different pieces of information may be determined at the block 602, and may vary from one application or implementation to another.

This power management data can comprise part of a power profile for each of the low power mode applications. In one embodiment, such power management data can be determined at the block 602 during a preliminary design phase or through circuit or software simulation testing techniques. The power management data can then be stored in tables, coded into software (including coding into the low power mode applications themselves), embodied as fixed or variable code, or stored in some other data structure format that allows such information to be later accessed during actual operation of the portable computer 100. The power management data can comprise the program data 326 in the system memory 306, can be stored in the hard disk drive 316, or can be stored as data in some other suitable storage location.

At a block 604, the portable computer 100 operates in a non-low power mode. For instance, the portable computer 100 may be fully operating in the S0 power state or may be sleeping in the S1-S2 power states. During the block 604 according to one embodiment, the low power mode service 520 or the low power mode subsystem 508 in the BIOS 314 is always running in the background and monitoring for events at a block 606. More specifically according to an embodiment, the low power mode service 520 or the low power mode subsystem 508 is used for monitoring or otherwise determining activity from the lid switch 112, activity from the LPDM 510, or other user-initiated action that is indicative of the user's 514 desire to operate the portable computer 100 in the low power mode.

If no event is detected at a block 608, then the monitoring continues at the block 606. However, if one of the specified events is detected at the block 608, then the low power mode service 520 is given control by the BIOS 314 and by the operating system kernel 528, and checks whether a low power mode application 538 is present at a block 610 or is otherwise requested to perform a task during the low power mode. If the low power mode application 538 is not present or is otherwise not requested to perform a task, then the portable computer 100 transitions to the standby mode at a block 612, such as the S3 power state. The BIOS 314, in one embodiment, can initiate the transition to the S3 power state at the block 612.

If the low power mode service 520 determines at the block 610 that the low power mode application 538 is present and is designated to perform a task during the low power mode, then the low power mode service 520 obtains the power management data associated with that low power mode application 538 at a block 614. Obtaining this data can be performed by calling the particular low power mode application 538 and obtaining the data therefrom, or by independently accessing a data store. In one embodiment, the power management data can be obtained at boot-up from the BIOS 314, rather than at the block 614 after the portable computer 100 has been operating in a non-LPM mode.

Based on the obtained power management data, the low power mode service 520 can be used for determining the power requirements and other operating parameters for the low power mode application 538 at the block 616. The low power mode service 520 generates and sends instructions to the operating system kernel 528 and/or to the BIOS 314 (via function calls, for instance) at a block 618. These instructions provide information that identifies portions of hardware, software, services, tasks, and the like for selective turn OFF, deactivation, or suspension, wherein such portions are unnecessary for operation of the low power mode application 538 during the low power mode. Furthermore, these instructions provided by the low power mode service 520 can specify a particular sequence in which the portions are to be turned OFF.

The BIOS 314 and/or the operating system kernel 528 can be used in an embodiment for sequentially turning OFF, suspending, or other deactivating at a block 620, such as basing these actions on operating dependencies between the various elements to be suspended, turned OFF, or otherwise deactivated. The operations at the block 620 also include reducing the speed of the processor clock. As the unnecessary elements are turned OFF, suspended, or otherwise deactivated, the portable computer 100 thus transitions into the low power mode of the S2.5 state. The low power mode application 538 is called or otherwise activated at a block 622 to begin performing one or more tasks in the low power mode.

As each task is performed and completed at the block 622, an embodiment of the low power mode service 520 checks to determine if certain elements or other resources associated with that particular task can be turned OFF as subsequent tasks are to be concurrently or subsequently performed by the low power mode application 538. This updated checking is represented in the flowchart 600 by iterative arrows that point from the block 622 back to either or both the blocks 614 and 616—if there are resources that can be turned OFF, then the operations in the blocks 618-622 are repeated.

The low power mode service 520 monitors for an event at a block 624 that signals a request to exit the low power mode. For instance, opening the lid of the portable computer 100 activates the lid switch 112, which communicates a signal to either the low power mode service 520 or to the BIOS 314 to exit the low power mode and return to the S0 power state. If such an event is detected at the block 624, then the low power mode service 520 generates a resume message to the operating system kernel 528 and/or to the BIOS 314, thereby allowing these components to un-suspend or otherwise activate previously deactivated hardware, software, services, tasks, and the like. Until such events are detected, the portable computer 100 continues operation in the low power mode at the block 622.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible and can be made without deviating from the spirit and scope of the invention.

For example, while some embodiments have been described in the context of interacting with a Windows XP™ kernel and operating in conjunction with the power states defined in the ACPI specification, the invention is not limited to these specific implementations. Other embodiments may be implemented with electronic devices that use a different operating system and/or that have power states defined using some other specification.

Moreover, various embodiments have been described wherein certain components communicate with other components in a specific sequence to accomplish a particular task. For instance, one embodiment has been described above where the lid switch 112 communicates with the BIOS 314, which then communicates with the low power mode service 520 to wake up that service. This is merely one example implementation, and there is no restriction to any particular communication sequence or restriction to use of only the specific components in the specific manner. Other routes of communications, other communication sequences and protocols, and other components may be used in various embodiments to wake up the low power mode service 520, or to accomplish other tasks.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable for an electronic device having a lid that has a display screen located on an inside surface of the lid and a low power display located on an outside surface of the lid, the method comprising:
   obtaining data indicative of parameters to operate a low power mode application during a low power mode of the electronic device, the low power mode application corresponding to but different from a full power mode installed application that operates during a full power mode of the electronic device;
   initiating transition to the low power mode in response to a closing of the lid of the electronic device and in response to operating, while the lid is closed to cover the display screen on the inside surface of the lid, an interface on the low power display located on the outside surface of the lid;
   using the obtained data to selectively suspend or terminate applications and operating system tasks running on the electronic device, wherein the suspending or terminating includes suspending or terminating the full power mode installed application;
   activating the low power mode application;
   using the obtained data to selectively deactivate elements of the electronic device during the low power mode;
   maintaining at least one element that is usable by the low power mode application during the low power mode activated while the at least one element is used by the low power mode application during the low power mode;
   deactivating the at least one element otherwise during operation of the low power mode application in the low power mode; and interacting between the low power mode application and the full power mode installed application, during the low power mode, using an application program interface (API).

2. The method of claim 1, further comprising substantially maintaining the deactivated elements deactivated during the low power mode until a transition to a higher power mode.

3. The method of claim 1 wherein the elements to be deactivated are unused by the low power mode application during the low power mode.

4. The method of claim 1 wherein selectively deactivating includes selectively deactivating the elements in a sequence from highest-level elements to lowest-level elements.

5. The method of claim 1 wherein deactivating elements of the electronic device includes communicating instructions to deactivate the elements to either one or both of an operating system kernel and a basic input output system.

6. The method of claim 1 wherein deactivating elements of the electronic device includes suspending tasks while in the low power mode, and resuming the tasks in response to a specific instruction rather than in response to an interrupt.

7. The method of claim 1 wherein selectively deactivating the elements includes selectively deactivating in a sequence from highest-level elements to lowest-level elements, including initially deactivating a first element whose operation depends on a second element, and then deactivating the second element subsequent to deactivating the first element.

8. An electronic device having a lid that has a display screen located on an inside surface of the lid and a low power display located on an outside surface of the lid, the electronic device comprising:
   means for obtaining data indicative of parameters to operate a low power mode application during a low power mode of the electronic device, the low power mode application corresponding to but different from a full power mode installed application that operates during a full power mode of the electronic device;
   means for initiating transition to the low power mode in response to a closing of the lid of the electronic device and in response to operating, while the lid is closed to cover the display screen on the inside surface of the lid, an interface on the low power display located on the outside surface of the lid;
   means for using the obtained data to selectively suspend or terminate applications and operating system tasks running on the electronic device, wherein the suspending or terminating includes suspending or terminating the full power mode installed application;
   means for activating the low power mode application;
   means for using the obtained data to selectively deactivate elements of the electronic device during the low power mode;
   means for maintaining at least one element that is usable by the low power mode application during the low power mode activated while the at least one element is used by the low power mode application during the low power mode;
   means for deactivating the at least one element otherwise during operation of the low power mode application in the low power mode; and application program interface (API) means for interacting between the low power mode application and the full power mode installed application, during the low power mode.

9. The electronic device of claim 8, further comprising means for substantially maintaining the deactivated elements deactivated during the low power mode until a transition to a higher power mode.

10. The electronic device of claim 8 wherein the elements to be deactivated are unused by the low power mode application during the low power mode.

11. The electronic device of claim 8 wherein the means for selectively deactivating includes means for selectively deactivating the elements in a sequence from highest-level elements to lowest-level elements.

12. The electronic device of claim 8 wherein the means for deactivating elements of the electronic device includes means for communicating instructions to deactivate the elements to either one or both of an operating system kernel and a basic input output system.

13. The electronic device of claim 8 wherein the means for deactivating elements of the electronic device includes means for suspending tasks while in the low power mode, and means for resuming the tasks in response to a specific instruction rather than in response to an interrupt.

14. The electronic device of claim 8 wherein the means for selectively deactivating the elements includes means for selectively deactivating in a sequence from highest-level elements to lowest-level elements, including means for initially deactivating a first element whose operation depends on a second element, and for then deactivating the second element subsequent to deactivating the first element.

* * * * *